Patented Oct. 23, 1928.

1,688,491

UNITED STATES PATENT OFFICE.

RAOUL GRIMOIN-SANSON, OF PARIS, AND HERMAN DANEL, OF ARGENTEUIL, FRANCE.

MANUFACTURE OF MOLDED AND VULCANIZED RUBBER-CORK ARTICLES.

No Drawing. Application filed August 28, 1926, Serial No. 132,390, and in France March 26, 1926.

Our invention relates to the manufacture of molded and vulcanized rubber articles containing cork, and it applies, especially, to the making of covers and inner tubes for pneumatic tires and of solid tires, whether honeycombed or not.

According to our invention, the material from which the said articles are manufactured is essentially composed of pure gum or india-rubber, powdered cork and emery. Of course, we add to this mass the substances required for vulcanization, such as, for instance, sulphur, together with the usual accelerators.

The material is worked in the following manner:

We mix gently the cork and the emery with the rubber by stirring the latter in a mixer, while adding the cork and emery in small lots.

Once the mass has become perfectly homogeneous, we put in the sulphur and the accelerators and again triturate to effect their incorporation. Lastly, we place the mass in suitable molds and vulcanize it while contained in said molds.

The final form of the article so manufactured will naturally be in accordance with the nature and the form of the mold employed.

We reserve the right to proportion in any way the components constituting the mass to be molded, the following formula being given here merely as an indication:

| | Kilograms. |
|---|---|
| Gum | 20 |
| Powdered cork | 2.5 |
| Very fine emery | 3 |

We claim as our invention:

1. A new article of manufacture consisting of a molded and vulcanized mixture of rubber, powdered cork, emery and a vulcanizing agent.

2. A new article of manufacture consisting of a molded and vulcanized mixture of rubber, powdered cork and emery in the proportion of 20 kilograms of rubber to 2.5 kilograms of cork and 3 kilograms of emery, and sulphur.

In testimony whereof we affix our signatures.

RAOUL GRIMOIN-SANSON.
HERMAN DANEL.